United States Patent [19]

McCormick

[11] 3,924,299
[45] Dec. 9, 1975

[54] CABLE TIES
[75] Inventor: Mathew McCormick, Didsbury, England
[73] Assignee: Bowthorpe Hellermann Limited, Sussex, England
[22] Filed: June 7, 1974
[21] Appl. No.: 477,537

[30] Foreign Application Priority Data
June 7, 1973 United Kingdom............... 27290/73

[52] U.S. Cl............................................. 24/16 PB
[51] Int. Cl.²......................................... B65D 63/00
[58] Field of Search... 248/74 PB; 24/16 PB, 73 PB, 24/17 AP, 30.5 P, 206 A

[56] References Cited
UNITED STATES PATENTS

| | | | |
|---|---|---|---|
| 3,022,557 | 2/1962 | Logan | 24/17 AP |
| 3,127,648 | 4/1964 | Emery | 24/16 PB |
| 3,144,695 | 8/1964 | Budwig | 248/74 PB X |
| 3,486,201 | 12/1969 | Bourne | 24/16 PB |
| 3,584,525 | 6/1971 | Caveney et al. | 24/16 PB X |
| 3,660,869 | 5/1972 | Caveney et al. | 24/16 PB |
| 3,761,999 | 10/1973 | Morgan | 24/16 PB |

FOREIGN PATENTS OR APPLICATIONS

| | | | |
|---|---|---|---|
| 219,644 | 1/1959 | Australia | 24/16 PB |
| 70,048 | 10/1958 | France | 24/16 PB |
| 1,573,303 | 7/1969 | France | 24/16 PB |

Primary Examiner—Donald A. Griffin
Attorney, Agent, or Firm—Brisebois & Kruger

[57] ABSTRACT

A moulded one-piece tie of plastics material for typing around a bundle of cables and the like comprising a flexible strap having serrations on one surface for locking with transverse teeth formed on a pivoted pawl when a free end of the strap is passed through an apertured head which is at the other end of the strap and which contains the pawl. Tension in the strap tending to withdraw it from the aperture pivots the pawl to more firmly grip the strap against an abutment surface opposite the pawl and to bend the strap over a transverse, substantially 90° ridge formed on the abutment surface intermediate the pawl pivot and the opposite end of the pawl.

2 Claims, 7 Drawing Figures

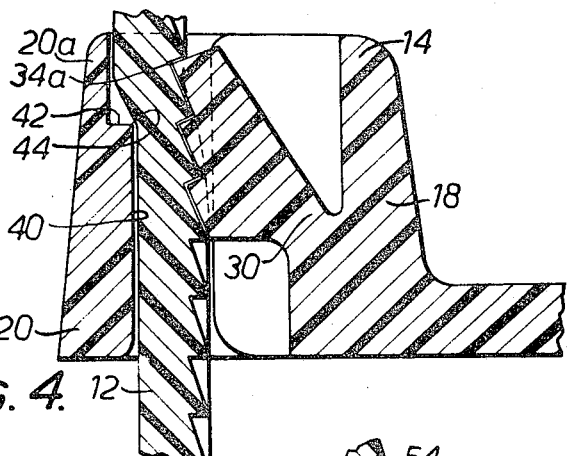
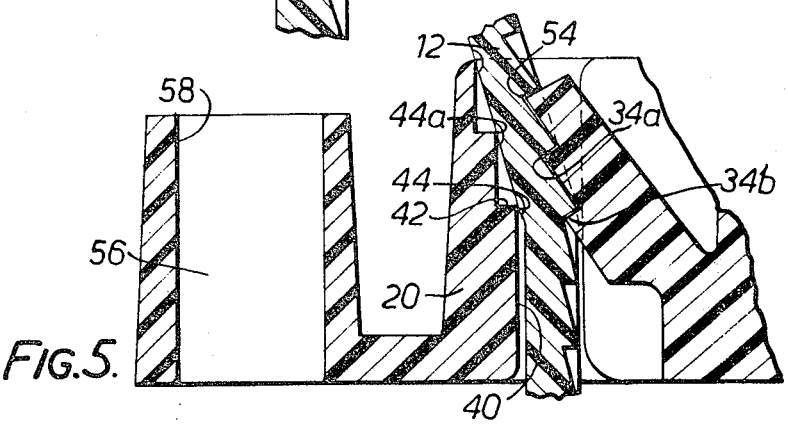
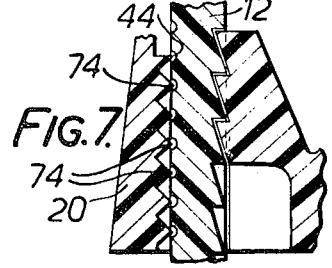
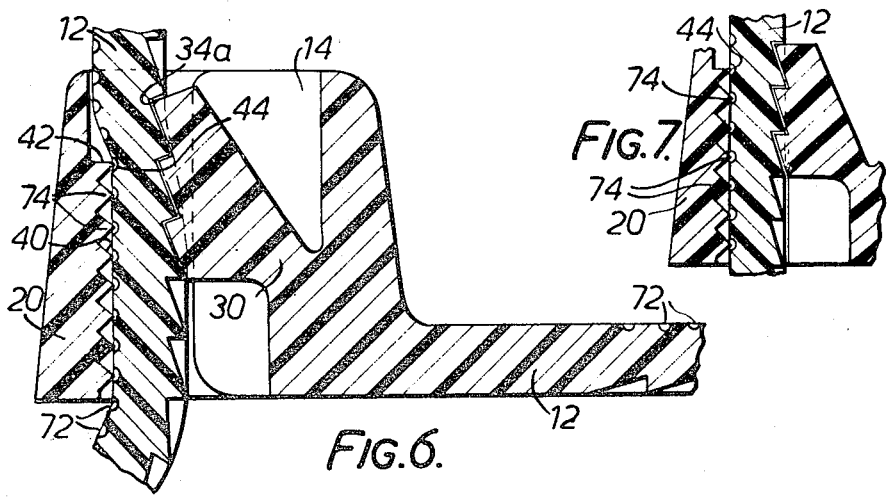

CABLE TIES

BACKGROUND & OBJECT OF THE INVENTION

This invention relates to a one piece tie of plastics material for tying around a bundle of cables and the like.

U.S. Pat. No. 3,127,648 to Emery was the forerunner of ties comprising a flexible strap having serrations on one surface for locking with transverse teeth formed on a pivoted pawl when a free end of the strap is passed through an apertured head which is at the other end of the strap and which contains the pawl, wherein any tension applied to the strap tending to withdraw it from the aperture acts to pivot the pawl so as to more firmly grip the strap against an abutment surface opposite the pawl. The Emery patent describes the formation of the tie by injection moulding and it is appreciated in the art that it is essential that the geometrical projection of the pawl onto the plane of the strap (when the tie is in its flat or as-moulded condition) must not overlap the projection of the abutment surface onto that plane, otherwise it would be impossible to mould the tie using two dies defining a cavity and separable in a straight line perpendicular to the plane of the strap.

U.S. Pat. No. 3,486,201 to Bourne represents a major advance on the Emery patent, in providing the aperture with guide ribs on opposite sides of the pawl for marginal plain portions of the strap to run upon as the strap is pulled through the aperture.

In order to tie the bundle of cables and the like firmly together, the ties are tied under high tension and the interlock between pawl and strap must be strong so as to withstand such tension. Ties in accordance with the Bourne patent are able to withstand higher tensions than equivalent ties according to the Emery patent, but there is a constant effort in the art to further improve the strength of the interlock.

It is therefore an object to provide a one piece cable tie able to withstand higher tensions in the strap when tied.

SUMMARY OF THE INVENTION

According to the present invention there is provided a one-pieece tie of plastics material, comprising a flexible elongate strap, a head at one end of the strap, an aperture extending through said head in a direction transverse to the plane of said strap, and a pivotably mounted pawl disposed within said aperture and formed with a transverse tooth, said aperture being formed opposite said pawl with an abutment surface and a transverse ridge, said ridge being formed by a junction between said abutment surface and a surface substantially perpendicular to said abutment surface, said ridge being disposed so as to lie, for at least substantially the whole pivotal movement of said pawl, between the projection on to the plane of said abutment surface of the crest of said pawl tooth and the pivot of said pawl and so that in the manufactured condition of said tie the projection of said ridge on to a plane perpendicular to said abutment surface does not overlap the projection on to that plane of any part of the pawl, a series of transverse ratchet serrations being formed on one side of said strap, and said ratchet serrations and pawl tooth being profiled so as to co-operate and permit passage of the free end of the strap through said aperture from the pivoted end of said pawl but to prevent subsequent withdrawal of said strap in the opposite direction, any tension applied to said strap in said opposite direction serving to pivot said pawl so as more firmly to grip said strap against said abutment surface and to bend said strap over said transverse ridge.

Embodiments of the invention will now be described by way of example only with reference to the accompanying drawings, in which:

FIG. 4 is a similar section through a modification of the tie shown in FIGS. 1 to 3, also when tied;

FIG. 5 is a partial vertical section through a further modification of the tie shown in FIGS. 1 to 3, also when tied;

FIG. 6 is a vertical section through another embodiment of cable tie; and

FIG. 7 is a partial vertical section through a modification of the tie shown in FIG. 6.

Figure 1:
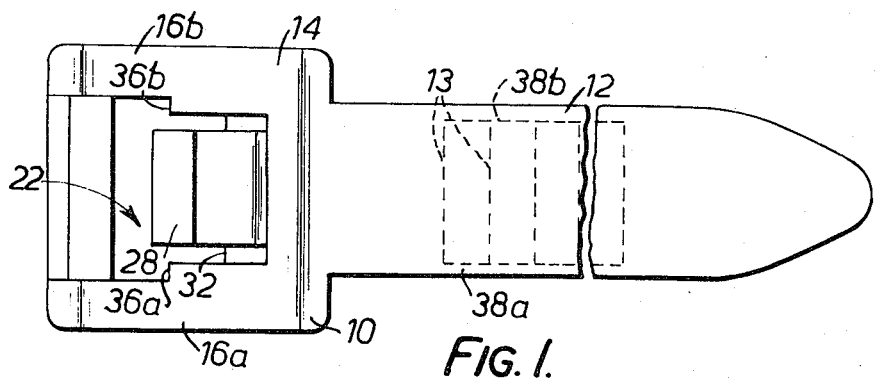
FIG. 1 is a plan view of a one-piece cable tie.
Figure 2:
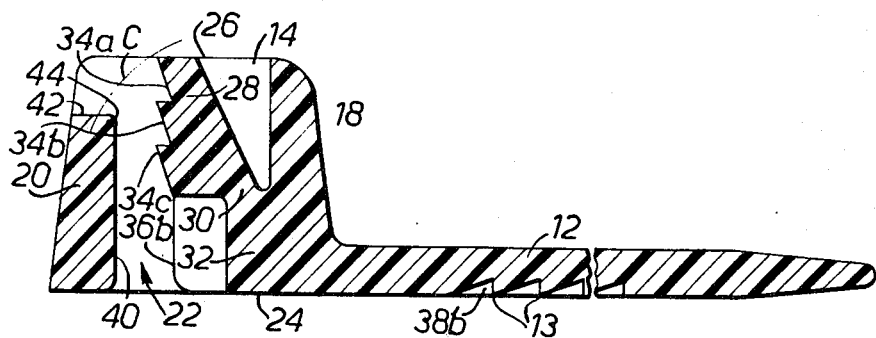
FIG. 2 is a vertical section through the cable tie of FIG. 1.
Figure 3:
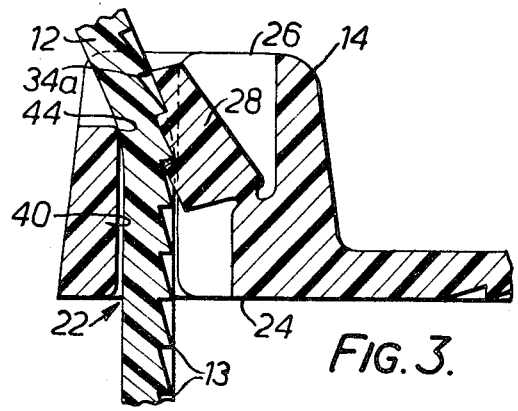
FIG. 3 is a similar section through the same tie when tied.

Referring specifically to FIGS. 1 to 3, there is shown a one-piece cable tie 10 of plastics material comprising a flexible elongate strap 12 provided with a series of transverse serrations 13 on one side thereof and a rectangular head 14 at one end thereof. The head 14 comprises a pair of side walls 16a, 16b and inner and outer end walls 18, 20; these four walls encompass an aperture 22 which extends through the head 14 transverse to the plane of the strap between an entry surface 24 and an exit surface 26 of the head. A pawl 28 is disposed within the aperture 22 and is movable about a pivot in a curve C across the aperture. The pawl extends through a reduced neck portion 30 from an upper horizontal surface of a ledge 32 disposed on the inner end wall 18 of the head and extending the full width of the aperture 22 to merge with the opposite side walls. The pawl pivots about the neck portion 30 but its pivot cannot necessarily be considered as a true point nor necessarily can the curve C be considered as an arc of a true circle.

The pawl is provided with three teeth 34a, 34b, 34c, for engagement with the serrations 13 on the strap when the free end of the strap is passed through aperture 22 to tie the tie, each pawl tooth being spaced from the pivot region 30 in a direction towards the exit surface 26 and each projecting towards the outer end wall 20. Although three teeth are shown, a greater or lesser number of teeth may be provided, and even a single tooth 34a may be provided if desired. In the example shown, the pawl terminates flush with the exit surface 26, although it may instead terminate short of the exit surface.

The head 14 is further provided with a pair of guiding abutments 36a, 36b one on each side wall, for marginal plain portions 38a, 38b of the strap to run upon when being pulled through the head. In this connection, the width of the aperture 22, between the opposite side walls, is slightly greater than the overall width of the strap 12, whilst the width of the serrations 13 across the strap is greater than the width of the pawl but less than the transverse distance between the two abutments 36a, 36b and the width of each such abutment is less than that of each marginal plain portion 38a and 38b. The abutments 36a, 36b are parallel to but spaced from an abutment surface 40 of the outer end wall by a distance slightly greater than the thickness of the strap 12 to define a passage through the head which is perpendicular to the plane of the strap. Alternatively, if desired, abutment surface 40 and hence this passage may be somewhat inclined to the vertical.

The outer end wall 20 is of lesser height than the side walls 16a, 16b and the inner end wall 18 and terminates at its top in a flat trapping surface 42 parallel to the plane of the strap. The flat trapping surface 42 meets the abutment surface 40 in a right-angled junction to form a transverse ridge 44 which is disposed between the projection on to the plane of the abutment surface 40 of the pivot portion 30 and the pawl tooth 34a. Preferably as shown the transverse ridge is no closer to the exit surface 26 than the projection on to the plane of the abutment surface of the second tooth 34b, and at best is further away. The latter two features are true not only for the tie in its manufactured condition but are also true throughout either the entire or substantially the entire pivoting movement of the pawl and preferably, as shown, the curve C, which is the locus of tooth 34a, passes through the flat trapping surface 42. The reasons for these features will become apparent when the tying action is described shortly in connection with FIG. 3.

The pawl teeth 34a, 34b, 34c project beyond the guiding abutments 36a, 36b towards the abutment surface 40, so that they will interengage with the strap serrations 13 when the tie is tied. It will be noted that the three pawl teeth lie in a common plane parallel to the abutment surface 40. Also, the projection of ridge 44 on to the plane of the strap does not overlap the projection on to that plane of any part of the pawl. This feature enables the tie to be manufactured by injection moulding using two dies defining a mould cavity and separable in a straight line perpendicular to the plane of the strap. The pawl teeth are formed by that die which leaves the head at the exit surface 26 thereof, that die camming against the pawl teeth to pivot the pawl slightly in the clockwise direction (as viewed in FIG. 2) to permit removal thereof.

A description will now be given, with reference to FIG. 3, of the tying around a bundle of cables of the cable tie shown in FIGS. 1 and 2. The strap 12 is looped around the bundle of cables (not shown) to be tied and the free end thereof is passed through the aperture 22 from the entry surface 24. Tension is then applied to the strap to pull it through aperture 22 and tight around the bundle of cables. As the strap is pulled through the aperture 22, the successive serrations 13 on the strap ride over the pawl teeth, causing the pawl 28 to pivot away from the strap to accommodate the linear movement thereof. When the tensioning force is removed from the free end of the strap, back-tension within the looped portion thereof causes the strap to move slightly in the withdrawal direction. The serrations 13 accordingly lock with the pawl teeth and the back-tension serves to pivot the pawl 28 so as more firmly to grip the strap. The pawl teeth 34b, 34c grip the strap against the abutment surface 40 while the pawl tooth 34a acts to bend the strap over the transverse ridge 44 and effect a trapping of the strap above the flat trapping surface 42.

The final position of the pawl 28 is as shown in FIG. 3, wherein the pawl is rotated slightly from its manufactured position towards the outer end wall 20. This displacement arises partly because the distance from the abutment surface 40 to the roots between the pawl teeth is slightly greater than the thickness of the strap, and partly as a result of the various regions of the head and pawl and of the strap portion within the head being stretched or compressed under the unfluence of the applied forces and in view of the inherent elasticity of the plastics material of which the tie is moulded. In particular the pivot portion 30 is deformed with the bottom end of the pawl pushed back towards the end wall 18 and this leads to firmer support for the pawl on the ledge 32.

In the event of increasing tension being applied to the strap in the withdrawal direction, the pawl will be caused to pivot more and more towards the outer end wall 20 and the pivot portion 30 will deform further until eventually the pawl abuts the wall 18. However, the disposition of the transverse ridge 44 relative to the pawl tooth 34a, as previously described, ensures that the pawl tooth 34a will always apply a gripping force to the strap along a line (tangential to curve C at that point) which intersects the plane of abutment surface 40 above the transverse ridge 44, so as always to bend the strap over the transverse ridge 44. Moreover, the degree to which the strap is bent over ridge 44 will increase with the withdrawing tension applied to the strap and accordingly the cable tie will be locked secure against excessive tensions within the strap.

The trapping action provides a lock additional to that provided by the grip of the strap against the abutment surface 40 and moreover prevents the possibility of the pawl being pivoted back through the aperture under excessive back tension in the strap. The combined lock of the trapping action and the grip of the strap against the abutment surface is almost perfect such that the strength of the tie is not so much limited by the lock as by the strength of the strap.

Referring now to FIG. 4, there is shown a modification of the cable tie shown and described with reference to FIGS. 1 to 3. In the modification of FIG. 4, the outer end wall 20 is of the same height as the side walls and inner end wall 18, but an uppermost portion 20a of the outer end wall is formed with a step to define the flat trapping surface 42 and the transverse ridge 44.

Referring now to FIG. 5, there is shown a modification of the cable tie of FIGS. 1 to 3 wherein a further tooth 54 is provided on the pawl closer to the exit surface 26 than the pawl tooth 34a which bends the strap over the transverse ridge 44. As shown, a second transverse ridge 44a may be provided and disposed so that the pawl tooth 54 will bend the strap 12 over the ridge, in addition to the pawl tooth 34a bending the strap over ridge 44. More than a single tooth 54 may be provided above pawl tooth 34a, with or without corresponding transverse ridges. Furthermore, this tie is provided with a mounting head extension 56 including a circular aperture 58, for use in mounting the tie to, for example, a support panel.

Referring now to FIG. 6, there is shown a further modification of the cable tie shown in FIGS. 1 to 3. The side of the strap 12 opposite the serrations 13 is provided with a series of transverse grooves 72 and a plurality of transverse projections 74 is provided on the outer end wall 20. The uppermost such projection provides the transverse ridge 44. Each projection 74 in the example shown is profiled as an isosceles triangle but may be of any other suitable profile. The projections are spaced equally to the spacing of the grooves 72 in the strap and phased relative to the serrations 13 such that the projections 74 engage the grooves 72 when the tie is tied, as shown.

Referring to FIG. 7, there is shown a modification of the tie of FIG. 6, wherein the projections 74 are sawtooth in cross-section.

Any of the cable ties of FIGS. 1 to 7 may be modified by dispensing with grooves 72 and instead providing a plain surface on the side of the strap opposite the serrations 13. In such case the projections 74 will bite into that plain surface when the tie is tied.

Although in each of the cable ties shown in the drawings the pawl extends from the strap-end of the head and the serrations 13 are provided on one particular side of the strap so as to lie against the bundle of cables when tied, alternatively the pawl may extend from the opposite end of the head with the serrations 13 provided on the opposite side of the strap so as to face outwardly when tied. Also, although the head 14 is shown in all Figures as including a wall (namely the inner end wall) behind the pawl, this wall may be dispensed with. Furthermore, the mounting head 56 shown in FIG. 5 may be dispensed with and any of the other ties may be provided with such a head.

The ties which have been described provide much improved locking strength. In addition, they are found to overcome a particular problem in the case where a mounting head is provided and the pawl extends from the strap-end of the head 14. In such case, the mounting head is susceptible to pressures which through a lever action subject the lock to high forces tending to loosen the lock. However, the trapping action is found to prevent any such loosening.

What is claimed is:

1. A one piece molded tie of plastics material comprising:
   a. a flexible elongate strap;
   b. a head at one end of said strap;
   c. there being an aperture extending through said head in a direction transverse to the plane of said strap;
   d. a pivotally mounted pawl disposed within said aperture;
   e. at least one first transverse tooth formed on said pawl;
   f. at least one second transverse tooth formed on said pawl;
   g. all said first and second teeth having their crests in a common flat plane;
   h. a wall on said head defining an abutment surface on one side of said aperture opposite said pawl and parallel to said common plane of pawl teeth crests while the top of said wall defines a surface substantially perpendicular to said abutment surface;
   i. a transverse ridge formed by a junction between said abutment surface and said substantially perpendicular surface;
   j. the projection of the crest of said at least one first pawl tooth onto the plane of said abutment surface lying, over at least substantially the whole pivotal movement of said pawl, further than said ridge from the projection of the pivot of the pawl onto said abutment surface;
   k. the projection of the crest of said at least one second pawl tooth onto the plane of said abutment surface lying closer than said ridge to the projection of the pivot of the pawl onto said abutment surface;
   l. said pawl, in the manufactured condition of the tie, being spaced from the plane of said abutment surface;
   m. a series of transverse ratchet serrations formed on one side of said strap; and
   n. said ratchet serrations and pawl teeth being complementarily profiled to cooperate and permit passage of the free end of the strap through said aperture from the pivoted end of said pawl but to prevent subsequent withdrawal of said strap in the opposite direction; and tension applied to said strap in said opposite direction serving to pivot said pawl for said at least one second pawl tooth to firmly grip said strap flat against said abutment surface and said at least one first pawl tooth to bend said strap over said transverse ridge.

2. A tie as claimed in claim 1, comprising:
   a second surface of said step;
   a further surface substantially perpendicular to said abutment surface;
   a further transverse tooth on said pawl with its crest lying in said common plane;
   a second transverse ridge formed by a junction between said second surface of said step and said further substantially perpendicular surface, said second ridge being disposed so that the projection thereof on to the plane of said abutment surface lies, for at least substantially the whole pivotal movement of said pawl, between the projections onto that plane of the crest of said further pawl tooth and the pivot of said pawl.

* * * * *